(12) United States Patent
Suekuni et al.

(10) Patent No.: US 7,338,072 B2
(45) Date of Patent: Mar. 4, 2008

(54) SIDE DOOR FOR VEHICLE

(75) Inventors: Tomohiro Suekuni, Okazaki (JP); Noritaka Nagayama, Okazaki (JP)

(73) Assignee: Mitsubishi Jidosha Kogyo Kabushi Kaisha, Tokyo (JP)

( * ) Notice: Subject to any disclaimer, the term of this patent is extended or adjusted under 35 U.S.C. 154(b) by 225 days.

(21) Appl. No.: 11/209,803

(22) Filed: Aug. 24, 2005

(65) Prior Publication Data

US 2006/0061072 A1    Mar. 23, 2006

(30) Foreign Application Priority Data

Sep. 21, 2004 (JP) ............................ 2004-273149

(51) Int. Cl.
   *B60R 21/16* (2006.01)
(52) U.S. Cl. ................. 280/730.2; 280/728.3
(58) Field of Classification Search ............ 280/728.3, 280/730.1, 730.2
   See application file for complete search history.

(56) References Cited

U.S. PATENT DOCUMENTS 5,979,932 A * 11/1999 Jourdaine et al. ........ 280/730.2
6,390,497 B1 * 5/2002 Shin ........................ 280/728.3
2002/0195800 A1   12/2002 Florsheimer
2003/0159875 A1 * 8/2003 Sato et al. .................. 180/274
2004/0155441 A1   8/2004 Hofmann
2005/0046158 A1 * 3/2005 Abe ....................... 280/730.1
2007/0023222 A1 * 2/2007 Okamoto et al. .......... 180/274

FOREIGN PATENT DOCUMENTS

| EP | 1510415 A1 | 3/2005 |
|---|---|---|
| FR | 2817519 A1 | 6/2002 |
| JP | 5-139238 A | 6/1993 |
| WO | WO-2004/087473 A1 | 10/2004 |

* cited by examiner

*Primary Examiner*—Paul N. Dickson
*Assistant Examiner*—Joseph Rocca
(74) *Attorney, Agent, or Firm*—Birch, Stewart, Kolasch & Birch, LLP

(57) ABSTRACT

A side door for a vehicle includes a folded airbag which inflates upward in response to a side collision of the vehicle, and a cover member disposed above the airbag and covering the airbag. The cover member has a plurality of sections arranged in a fore-aft direction of the vehicle. The sections are defined by a hinge portion extending generally straight in the fore-aft direction of the vehicle and a plurality of lateral thin portions extending from the hinge portion generally in a lateral direction of the vehicle. When the airbag inflates, by means of inflation force of the airbag, the lateral thin portions rupture and the individual sections rotate about the hinge portion and open.

8 Claims, 4 Drawing Sheets

SIDE DOOR FOR VEHICLE

BACKGROUND OF THE INVENTION

1. Field of the Invention

The present invention relates to a side door for a vehicle which includes an airbag that inflates upward from the side door in response to, for example, a side collision of the vehicle, to thereby protect the head and other body parts of a vehicle occupant.

2. Description of the Related Art

Japanese Patent Application Laid-Open (kokai) No. H5-139238 discloses a conventional side door for a vehicle designed to cause an airbag to inflate upward from the side door in response to a side collision of the vehicle.

The publication does not specifically disclose a structure which enables a trim cover to be push-opened upon inflation of the airbag. However, in general, a thin portion which is readily bent and serves as a hinge portion is provided at the upper portion of the trim cover such that the hinge portion extends straight over a long distance in the fore-aft direction of the vehicle. In this case, upon receipt of inflation force of the airbag, the entire upper wall portion of the trim cover is push-opened such that the upper wall portion rotates as a single member about the straight hinge portion, and thus an opening through which the airbag inflates is formed.

However, when the vehicle undergoes a side collision with a tree or the like and a side door is locally deformed toward the interior of the vehicle, the above-mentioned hinge portion is also deformed locally and its straightness is not maintained at the deformed portion, so that the hinge portion becomes unable to provide its hinge action for the entire upper wall portion of the trim cover. Accordingly, even when the upper wall portion of the trim cover receives inflation force of the airbag, the upper wall portion of the trim cover does not open smoothly, whereby an opening for inflation of the airbag is not properly formed, resulting in occurrence of a problem that the airbag cannot be inflated reliably.

SUMMARY OF THE INVENTION

In view of the foregoing, an object of the present invention is to provide a side door for a vehicle in which at the time of, for example, a side collision of the vehicle, an upper portion of the door trim of the side door is smoothly opened by means of inflation force of the airbag, to thereby enable the airbag to inflate without fail.

To achieve the above object, the present invention provides a side door for a vehicle comprising a folded airbag which inflates upward in response to a side collision of the vehicle, and a cover member disposed above the airbag and covering the airbag. The cover member has a plurality of sections arranged in a fore-aft direction of the vehicle. The sections are defined by a first weak portion extending generally straight in the fore-aft direction of the vehicle and a plurality of second weak portions extending from the first weak portion generally in a lateral direction of the vehicle. When the airbag inflates, by means of inflation force of the airbag, the second weak portions rupture and the individual sections rotate about the first weak portion and open.

BRIEF DESCRIPTION OF THE DRAWINGS

The present invention will became more fully understood from the detailed description given herein below and the accompanying drawings which are given by way of illustration only, and thus are not limitative of the present invention and wherein.

DESCRIPTION OF THE PREFERRED EMBODIMENTS

Figure 1:
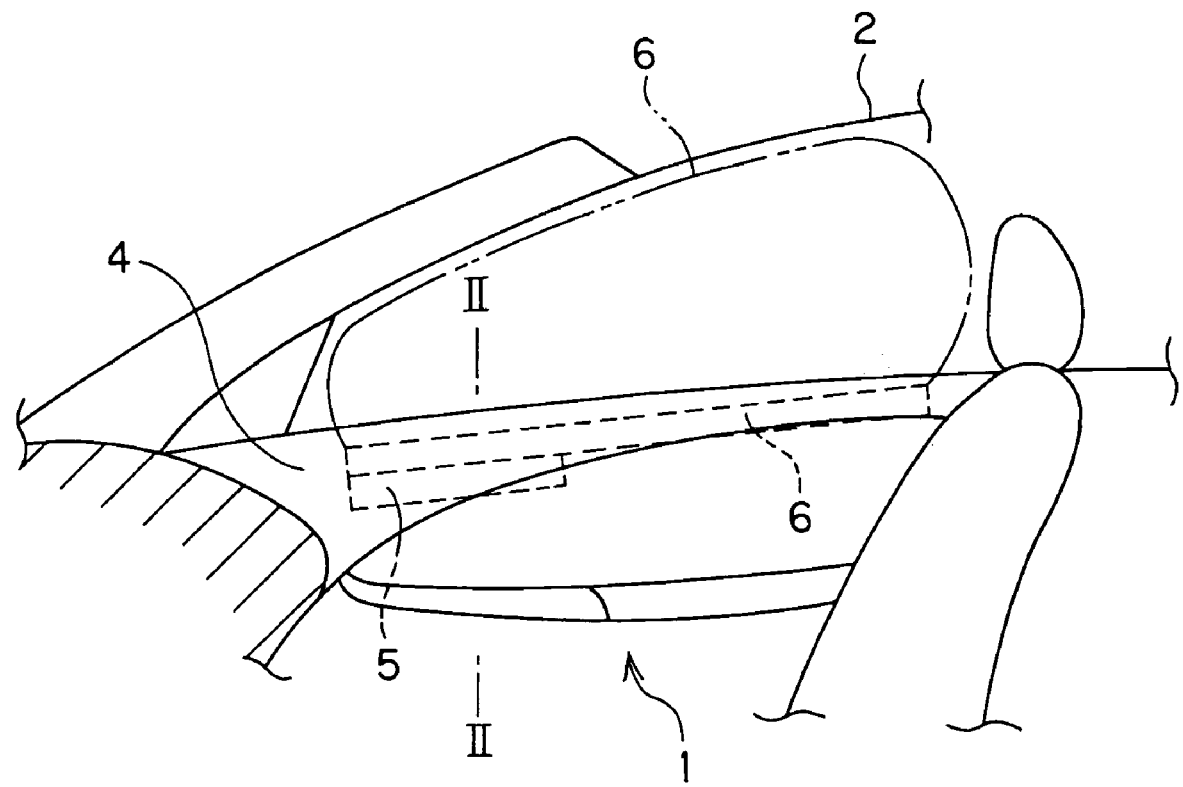
FIG. 1 is a schematic view of a side door according to an embodiment of the present invention as viewed from the interior of the vehicle.

Embodiments of the present invention will now be described with reference to the drawings in which like portions are denoted by the same reference numerals.

Figure 2:
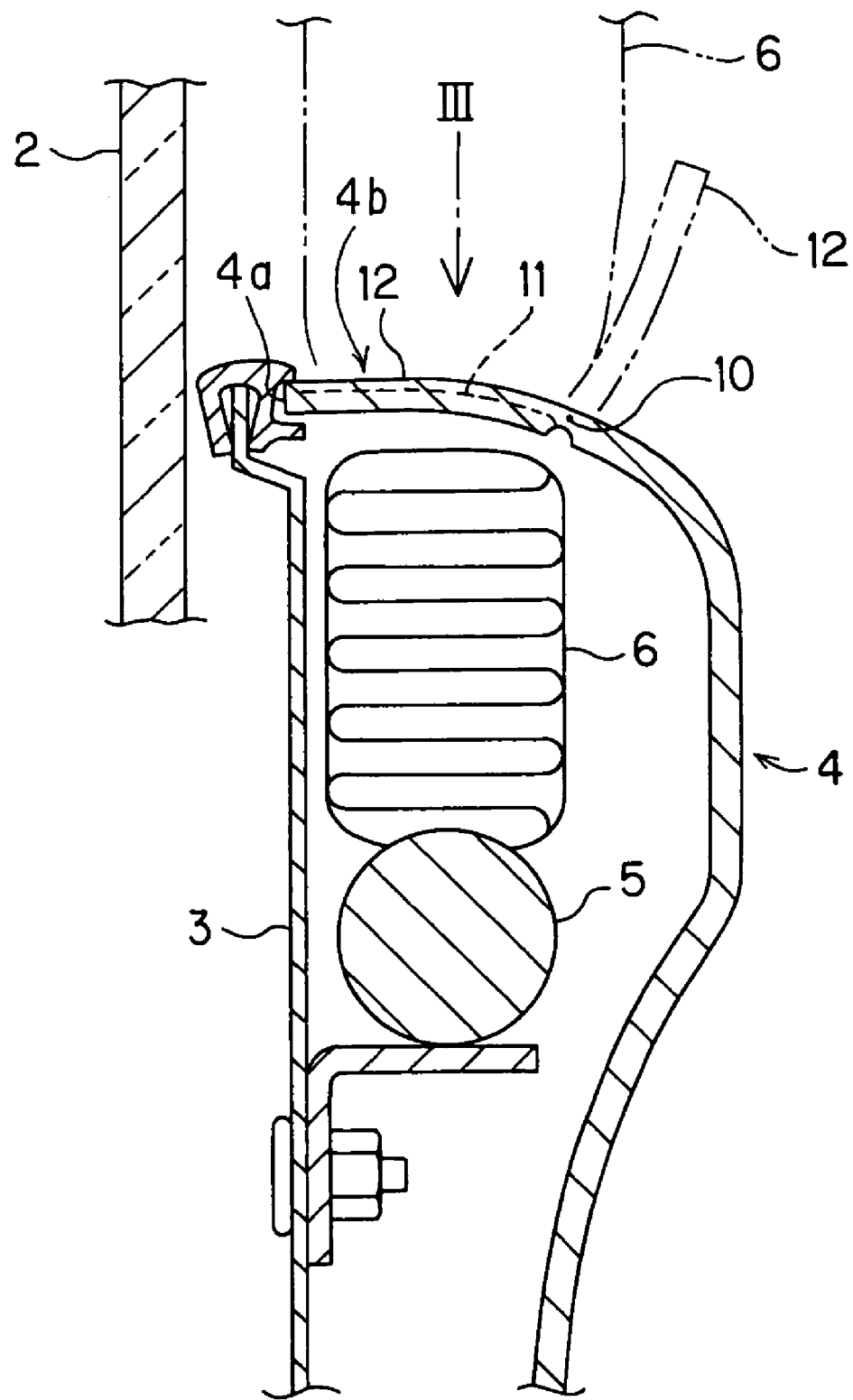
FIG. 2 is an enlarged vertical cross-sectional view taken along line II-II of FIG. 1.
Figure 3:
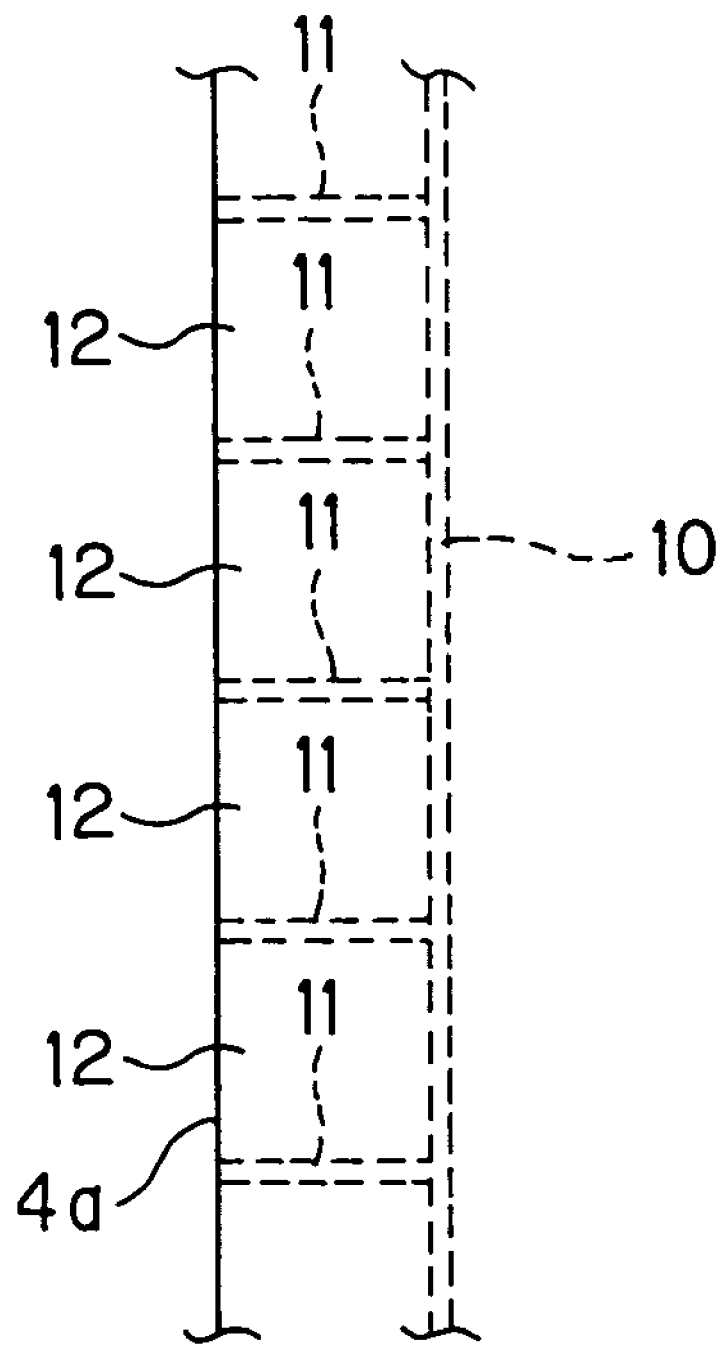
FIG. 3 is a view as viewed in the direction of arrow III of FIG. 2.

In FIGS. 1 to 3, a side door 1 of a convertible vehicle includes a door inner panel 3 disposed on a side of a window glass 2 toward the interior of the vehicle, and a door trim 4 disposed on a side of the door inner panel 3 toward the interior of the vehicle. A gas generation unit 5 and a folded airbag 6 extending in the fore-aft direction of the vehicle are disposed between the door inner panel 3 and the door trim 4, and are supported by means of the door inner panel 3. At the time of a side collision of the vehicle, the gas generation unit 5 injects a gas into the airbag 6, whereby the airbag 6 inflates upward in a wide region extending in the fore-aft direction of the vehicle.

A hinge portion (first weak portion) 10 and a plurality of lateral thin portions (second weak portions) 11 are provided on an upper portion of the door trim 4. The hinge portion 10 is formed through removal of the material of the door trim 4 from the inner side thereof, and extends generally straight in the fore-aft direction of the vehicle. The lateral thin portions 11 are formed through deeper removal of the material of the door trim 4 from the inner side thereof so that the lateral thin portions 11 are smaller in wall thickness than the hinge portion 10, and extend between the hinge portion 10 and an edge portion 4a of the door trim 4. Thus, an upper wall portion 4b of the door trim 4, which serves as a cover member, is divided into a plurality of sections 12 each sandwiched by two lateral thin portions 11 in the fore-aft direction of the vehicle.

Accordingly, when the vehicle undergoes a side collision with a tree or the like, the gas generation unit 5 injects a gas into the airbag 6, and the airbag 6 starts to inflate upward in a wide region extending in the fore-aft direction of the vehicle 6. Upon receipt of the inflation force, the lateral thin portions 11 are easily ruptured, and the sections 12 individually start to open or rotate upward about the hinge portion 10.

At this time, even if the hinge portion 10 has been locally deformed at a location at which the vehicle had collided with a tree or the like so that the hinge portion 10 is not straight at that location, in the remaining locations, the hinge portion 10 is maintained substantially straight. Therefore, some sections 12 extending from the generally straight portions of the hinge portion 10 easily rotate upward about the generally straight portions of the hinge portion 10, when they are push-opened by means of the inflation force of the airbag 6. Further, it becomes easier for a wall section(s) 12 extending from the locally deformed portion of the hinge portion 10 to open, because when the sections 12 extending from the generally straight portions of the hinge portion 10 are push-opened and the airbag 6 inflates upward there, upward forces act on a side portion(s) of the wall section(s) 12 extending from the locally deformed portion of the hinge portion 10, whereby the wall section(s) 12 easily opens. Further, since the lateral thin portions 11 have the above-described shape, the sides (edges) of the sections 12 opposite the hinge portion 10 become free, so that the sections 12 can easily rotate about the hinge portion 10.

As a result, as indicated by a two-dot chain line in the drawings, all the sections 12 are push-opened upward by means of the airbag 6, so that the airbag 6 can inflate upward, without fail, in a wide range extending in the fore-aft direction of the vehicle, and deploys into a generally film-like shape along the interior side of the window glass 2. Therefore, at the time of a side collision of the vehicle, the head and other body parts of a vehicle occupant can be easily protected. Further, since the cover member is constituted by the upper wall portion 4b of the door trim 4, appearance is improved, and the number of components can be reduced.

Figure 4:
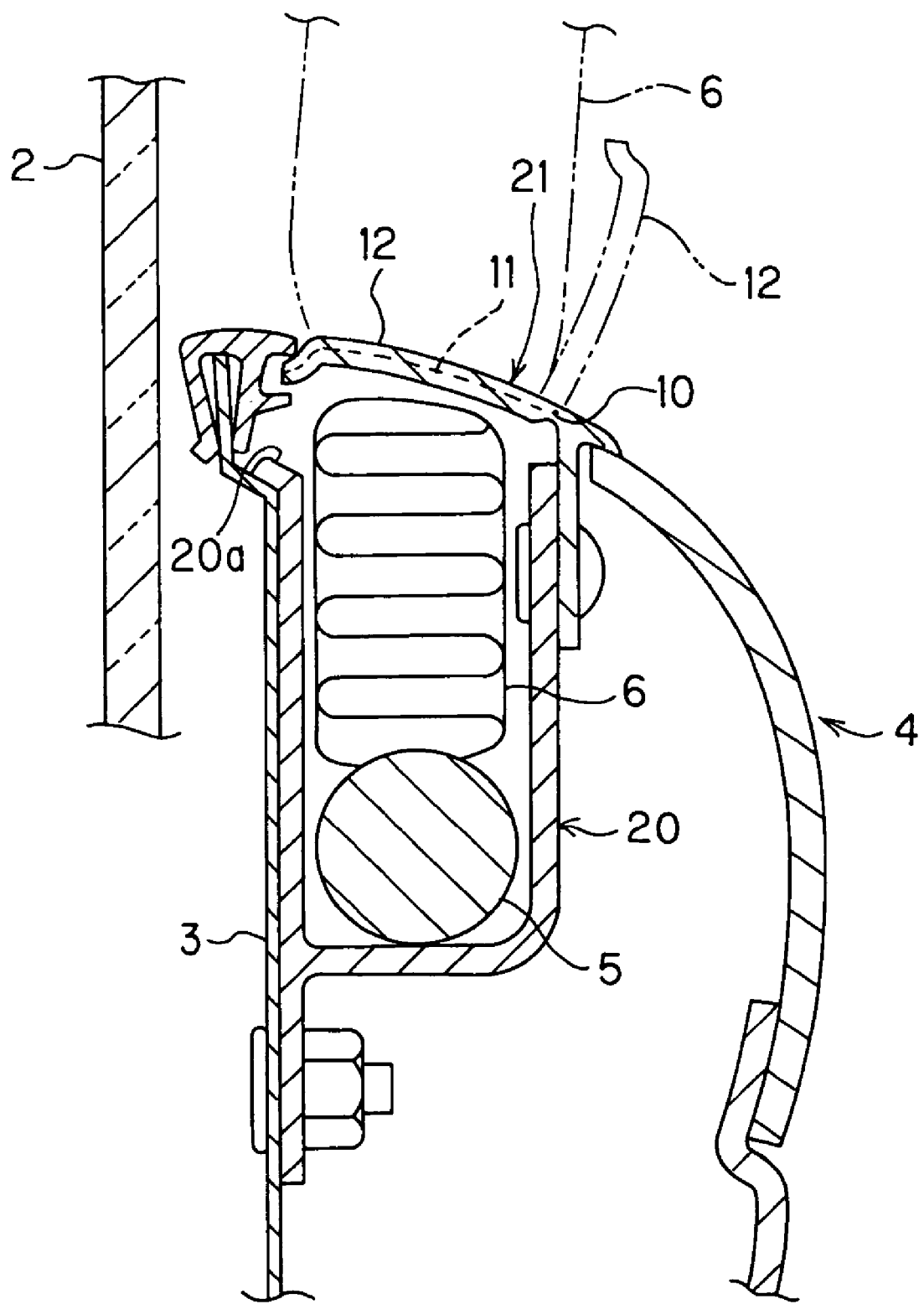
FIG. 4 is a vertical cross-sectional view corresponding to FIG. 2 and showing another embodiment of the present invention.

In an embodiment shown in FIG. 4, the gas generation unit 5 and the airbag 6 are accommodated within a case 20 having an opening 20a, through which the airbag 6 inflates. The case 20 is disposed in an upper portion of the space between the door inner panel 3 and the door trim 4, and is mounted to the door inner panel 3. A separate lid member (cover member) 21 is attached so as to close the opening 20a of the case 20. A hinge portion 10 and a plurality of lateral thin portions 11 similar to those in the above-described embodiment are provided on the lid member 21, whereby sections 12 are formed on the lid member 21. The structures of remaining portions are identical with those of the above-described embodiment.

Accordingly, the side door according to the present embodiment achieves the same action and effects as those attained by the side door according to the above-described embodiment. In addition, since the gas generation unit 5 and the airbag 6 are accommodated within the case 20 for modularization, the accuracy of relative position of the airbag 6 with respect to the sections 12 of the lid member 21 can be easily improved. As a result, the stability of operation of push-opening the sections 12 by means of the inflation force of the airbag 6; i.e., operation of inflating the airbag 6, can be enhanced. In addition, a practical advantage of facilitating the mounting of the gas generation unit 5 and the airbag 6 can be attained.

Notably, in the embodiment of FIG. 4, the case 20 is mounted to the door inner panel 3. However, needless to say, the case 20 may be mounted to the door trim 4 or to an appropriate structural member within the side door 1.

In the above-described embodiments, the hinge portion 10 and the plurality of lateral thin portions 11, which are weak portions, are formed on the upper wall portion of the door trim 4 or the lid member 21 by removing the material from the inner side. However, in the case where a surface film is provided on the door rim 4 or the lid member 21, the hinge portion 10 and the lateral thin portions 11 may be formed by means of intermittent slits such as perforations.

Obviously, numerous modifications and variations of the present invention are possible in light of the above teachings. It is therefore to be understood that within the scope of the appended claims, the present invention may be practiced otherwise than as specifically described herein.

What is claimed is:

1. A side door for a vehicle comprising:
  a folded airbag which inflates upward in response to a side collision of the vehicle; and
  a cover member disposed above the airbag and covering the airbag, wherein
  the cover member has a plurality of sections arranged in a fore-aft direction of the vehicle, and said cover member is formed by an upper end portion of a door trim such that said cover member extends from an edge portion of the door trim to a hinge portion of the door trim and is connected to the remaining part of said door trim by said hinge portion;
  the sections are defined by a first weak portion extending generally straight in the fore-aft direction of the vehicle defining said hinge portion and a plurality of second weak portions extending from the first weak portion generally in a lateral direction of the vehicle; and
  when the airbag inflates, by means of inflation force of the airbag, the second weak portions rupture and the individual sections rotate about the hinge comprising the first weak portion and open such that a plurality of sections are push-opened by the inflation force of the airbag.

2. A side door for a vehicle according to claim 1, wherein the second weak portions extend up to an edge portion of the cover member opposite the first weak portion.

3. A side door for a vehicle according to claim 2, wherein the airbag is disposed between a door panel and a door trim of the side door.

4. A side door for a vehicle according to claim 2, wherein the airbag is accommodated within a case having an opening through which the airbag inflates, and the cover member closes the opening.

5. A side door for a vehicle according to claim 1, wherein the airbag is accommodated within a case having an opening through which the airbag inflates, and the cover member closes the opening.

6. A side door for a vehicle according to claim 1, wherein said edge of each of said individual sections extends under said door panel.

7. A side door for a vehicle according to claim 1, wherein an edge of each of the individual sections extends to the door panel.

8. A side door for a vehicle according claim 1, said first weak portion extending along a boundary of the individual sections; and
  said plurality of second weak portions being interposed between the individual sections and extending transversely from the first weak portion to said door panel.

* * * * *